United States Patent

Gerbitz

[15] 3,697,852

[45] Oct. 10, 1972

[54] TRANSISTOR SWITCHING REGULATOR

[72] Inventor: Clarence G. Gerbitz, Red Hook, N.Y.

[73] Assignee: International Business Machines Corporation, Armonk, N.Y.

[22] Filed: April 30, 1971

[21] Appl. No.: 139,076

[52] U.S. Cl. ......................321/2, 307/254, 307/270, 317/DIG. 6, 321/11, 321/45 R

[51] Int. Cl. ..........................H02m 3/32, H03k 17/60

[58] Field of Search......321/2, 11, 45 R; 323/DIG. 1; 307/202, 254, 302, 270; 317/DIG. 6

[56] References Cited

UNITED STATES PATENTS

| | | |
|---|---|---|
| 3,268,776 | 8/1966 | Reed......................307/254 X |
| 3,319,146 | 5/1967 | Kearsley........................321/2 |
| 3,381,202 | 4/1968 | Loucks et al.................321/2 |
| 3,597,630 | 8/1971 | Compoly et al........307/254 X |
| 3,551,777 | 12/1970 | Bingley..........................321/2 |

FOREIGN PATENTS OR APPLICATIONS

| | | |
|---|---|---|
| 821,766 | 10/1959 | Great Britain.............307/254 |

OTHER PUBLICATIONS

Electronics, " Germanium Transistor as Avalanche Switch," Nov. 30, 1964, Page 44.

IBM Technical Disclosure Bulletin, " Pulse Storage Unit," Vol. 3, No. 6, pp. 32, 33, Nov. 1960.

Electronic Design, " High Voltages Switched with a Single Transistor," pp. 98, 100, June 21, 1967

IBM Technical Disclosure Bulletin," Sequential Transistor Switch Power Supply," Vol. 13, No. 8, pp. 2310, 2311, Jan. 1971.

*Primary Examiner*—William H. Beha, Jr.

*Attorney*—Hanifin & Jancin and Thomas F. Galvin

[57] ABSTRACT

A transistor switching regulator for a power supply including a DC source, a transformer primary, a switching transistor, and a control transistor operated in switching mode connected in series. The switching transistor and control transistor aRe connected in series relationship. The switching transistor has a DC bias connected to its base so that switching is driven into or near saturation when the control transistor is turned on and driven in its open-emitter cut off condition when the control transistor is cut off. The switceing transistor can accept voltage surges induced at turn-off in the transformer primary up to its collector-base breakdown characteristic ($BV_{cbo}$).

10 Claims, 11 Drawing Figures

INVENTOR
CLARENCE G. GERBITZ

BY Thomas F. Galvin
AGENT

FIG. 2a $V_C$ (SWITCH), FIG. 2b $I_{CLAMP}$, FIG. 2c $I_{PRIMARY}$, FIG. 2d $V_B$ (CONTROL), FIG. 2e $I_B$ (SWITCH)

TRANSISTOR SWITCHING REGULATOR

BACKGROUND OF THE INVENTION

1. Field of the Invention

This invention relates to power supplies and more particularly to voltage regulators wherein DC is chopped into AC to operate a transformer which in turn energizes a load circuit.

2. Description of the Prior Art

Transistor switching regulators of this general type, for example, in RCA Silicon Power Circuit Manual, 1967, pp. 147–161, provide a desirable means of regulating a DC output by utilizing a DC-AC-DC double conversion with the AC portion operated in a variable duty-cycle to enable regulation of the DC output. One kind, known as limit cycle regulators, employ a switching transistor directly in series with the rectifier; but the usual arrangement is to employ a transformer with the primary energized through the switching circuitry and the secondary connected to the rectifier. Use of the transformer is desirable because multiple outputs of various voltage and current ratings can be furnished conveniently, and also because it is possible to utilize a high voltage source to power a low voltage load or vice-versa and the specifications of the device can be altered to suit the characteristics of connecting equipment and to maximize economies in device selection in the design of the circuit.

When a transistor switching regulator is operated directly from the power line, the switching devices must be able to withstand relatively high voltage. For example, a 230 volt rms AC source when rectified yields about 300 volts DC. Moreover, in transformer-coupled transistor regulator circuits the transformer primary switching device may be required to withstand a voltage considerably higher than the input source voltage, $E_{in}$, since the sum of $E_{in}$ and the reset voltage, $V_r$, at the primary of the transformer develops at the switching device during the off portion of the switching cycle. In order to reset the transformer quickly it is desired that $V_r$ be substantial and preferably in the same order as $E_{in}$ so that $E_{in} + V_r$ typically equals $2 \cdot E_{in}$. An additional requirement of the switching device is that it must be able to withstand the power dissipation which occurs as it cuts off, while there is still current flowing and this high reset voltage is developing at the switching device. These demands on the switching device have made it difficult in the prior art to provide a reliable, cost-competitive switching regulator of this kind which operates from line voltage.

SUMMARY OF THE INVENTION

Accordingly, it is the principal object of the invention to provide an improved transistor switching regulator.

Another object of the invention is to provide an improved regulator which is able to use components with relatively low voltage ratings in a high voltage circuit.

Still another object of the invention is to provide an improved regulator characterized by minimum dissipation in the transistor switching circuit both when it is on and during turn-off.

Other objects of the invention will be apparent from the foregoing, from the detailed description set forth hereinbelow and from the drawings.

The present invention provides a transistor switching regulator having a switching circuit which is characterized by ability to withstand high voltages and which will operate at high speed so as to switch with minimum power dissipation at the switching means.

The switching means comprises a series connection of a switching transistor and a control transistor, the switching transistor being provided with a bias connection to its base and the emitter of the switching transistor being connected to the emitter-collector path of the control transistor so that when the control transistor is cut off the switching transistor is in open-emitter condition. This allows usage of the open emitter breakdown characteristic, $BV_{cbo}$, of the switching transistor as the design limit for operation of the switching circuit and provides a rapidly switching circuit which minimizes power dissipation.

In a preferred embodiment, the transistor switching regulator includes a series connection of an unregulated DC source, a transformer primary, a switching transistor and a control transistor, the emitter of the switching transistor being connected to the collector of the control transistor in the case of devices of the same polarity type, or to the emitter of the control transistor in the case of devices of opposite polarity type. DC bias is connected to the base of the switching transistor to operate the latter at or near saturation when the control transistor is on. When both transistors are at or near saturation, nearly the entire DC supply appears across the transformer primary and very little is dissipated in the transistors.

With the control transistor at or near saturation, the bias required for saturation of the switching transistor is only the sum of the voltage through the control transistor and the base-emitter circuit of the switching transistor. This bias may be provided in a manner which ensures that the switching transistor will be driven rapidly into saturation when the control transistor is turned on.

Even if the control transistor is operated in its active region, so as to limit the emitter current in the switching transistor at turn on, the drop across the control transistor is never more than a few volts and almost the entire voltage at cut-off is borne by the switching transistor, utilizing its $BV_{cbo}$ characteristic. Because all of the drop is concentrated across the switching transistor, no voltage apportioning circuits with attendant time delays are necessary in the base drives. Thus very rapid, low dissipation switching action is attainable.

DESCRIPTION OF THE PREFERRED EMBODIMENT

Figure 1:
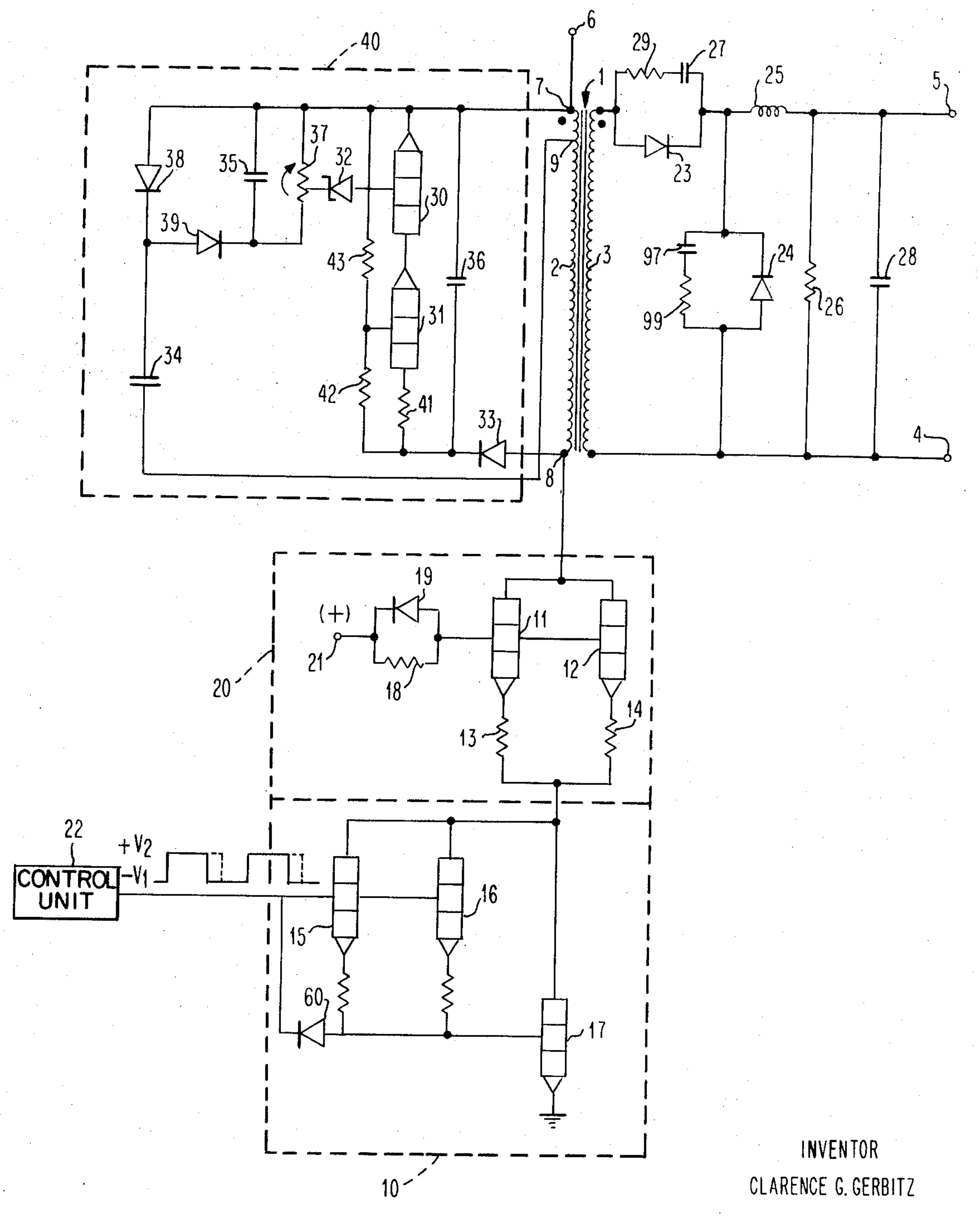
FIG. 1 is a schematic diagram of a transistor switching regulator embodying a preferred form of the invention.

Referring now to FIG. 1, it is desired to obtain a regulated DC output voltage across terminals 4 and 5 from an unregulated, high voltage DC input voltage supply at terminal 6. In the present example the voltage at terminal 6, termed $E_{in}$, is around 300 volts but may vary from 240 to 380 volts.

The converter regulator of this invention includes a power transformer 1 having primary and secondary windings 2 and 3, respectively. Supply $E_{in}$, primary winding 2, switching element 20 and control element 10 comprise a series drive circuit such that when elements 20 and 10 are conducting, current flows in the circuit, producing a potential across primary winding 2 nearly equal to $E_{in}$. As will be more fully explained in a later section, when control element 10 is made conductive by pulses from control unit 22, switching element 20 is also conductive; and when element 10 is non-conductive element 20 is non-conductive also. Thus, the potential across winding 2 remains essentially at $E_{in}$ as long as element 10 is turned on. When control element 10 is opened, switching element 20 turns off, and the field built up in winding 2 begins to collapse, creating a reset voltage, $V_r$, at terminal 8 and the collector of transistors 11 and 12.

The primary winding 2 time-averages the alternating voltage impressed across it; thus the voltage-time duration areas above and below a reference axis of $E_{in}$ and $V_r$ are equal.

With the polarity of windings 2 and 3 as indicated by the dots, a pulsating signal with current flow in the opposite direction to that in primary winding 2 will appear across secondary winding 3. Diode 23 acts as half-wave rectifying means whereby current pulses in secondary winding 3 render diode 23 conducting, thereby delivering energy into a filter circuit comprising inductor 25 and capacitor 28. So-called "free-wheeling" diode 24 provides a path for current through inductor 25 between those power pulses. The useful load (not shown) is connected at terminals 4 and 5. Resistor 26 is also part of the load circuit and ensures that there will always be a load connection even at no-load conditions. The series connection of capacitor 27 and resistor 29 and of capacitor 97 and resistor 99, respectively, across diodes 23 and 24 serve as high frequency noise suppressors for the diodes. The operation of the half-wave rectifying means and the filter circuit is well known to those of skill in the art and will not be described further.

The voltage induced in the primary winding 2 at turn-off of switching transistors 11 and 12 adds to the supply voltage, $E_{in}$, to form a voltage spike at the collectors of the switching transistors. This voltage could exceed the applicable collector to base breakdown voltage of the switching transistors ($BV_{cbo}$). In order to prevent this, regulation means 40 is provided across the primary winding. Moreover, diode 19 in the base circuit provides reverse base drive to switch the operating point of the transistors through the region of high dissipation as rapidly as possible.

Regulation means 40 includes a peak detector connected at terminal 9 of the primary winding and comprises capacitor 34, diodes 38 and 39 and capacitor 35. When the portion of the potential across capacitor 35 taken at potentiometer 37 exceeds the zener drop through zener-diode 32, current flows through potentiometer 37 and through zener-diode 32, turning on transistors 30 and 31. Capacitor 35 charges to a per cent of the excursion of terminal 9 (and thus terminal 8) with respect to terminal 7, to alter the conduction of transistors 30 and 31 and thus the rate at which regulation means 40 dissipates energy. Transistors 30 and 31 form a series connection with diode 33 between terminals 7 and 8 of primary winding 2 and operate together with capacitor 36 to prevent the voltage at terminal 8 from exceeding a selected level.

Control unit 22 supplies variable-duty-cycle square pulses to operate control element 10. The width of the pulses may be varied, as indicated, according to variations in the unregulated supply or in the regulated output. Preferably, feedback from the regulated output is compared with a reference potential. The difference is sensed and applied to a pulse width control circuit which drives a square wave oscillator. Circuits of this kind are known and are described, for example, in an article by R. Bruce in Electronic Products Magazine, January 10, 1971, pp. 33–37. Note particularly FIG. 4, page 34, of that article for a typical fixed frequency, variable width pulse generator circuit yielding a pulse train like that illustrated herein.

Control element 10 is shown as comprising a compound connection of parallel transistors 15 and 16 and transistor 17 in a grounded-emitter configuration. As is well known to those of skill in this art the compound connection increases the current gain of the switch. For purposes of explanation and design, transistors 15, 16 and 17 may be considered as a single transistor; hereafter they will be referred to as control element 10 or reference will be made to transistor 17 without discussion of transistors 15 and 16. Control element 10 is preferably comprised of low voltage transistors capable of rapid switching. They are not affected by the large voltage switchings at the primary winding and actually see only a variation of a few volts.

Switching element 20 preferably comprises a pair of high-voltage transistors 11 and 12 connected for parallel operation. This increases the current- and power-handling capabilities of the high-voltage transistors. The transistors are preferably matched to equalize collector current flow. Emitter resistors 13 and 14 also tend to equalize current flow and thereby provide temperature stability. Diode 19 and resistor 18 form a parallel connection between bias source 21 and the bases of transistors 11 and 12. Diode 19 operates to maintain a constant bias at the base of transistors 11 and 12 at cut-off. Resistor 18 is a bias limiter to the base at turn-on. Each high-voltage transistor is turned on at its emitter when control element 10 turns on. Transistors 11 and 12 preferably operate in saturation and transistor 17 operates near saturation so that, at turn on, practically the entire $E_{in}$ at terminal 6 drops across primary winding 2.

When transistor 17 is turned off, transistors 11 and 12 are also turned off. The turn-off of transistors 11 and 12 in saturation is relatively fast because they are connected through diode 19 in, in effect, grounded-base configuration. In addition, at turn off, transistors 11 and 12 are in an open emitter configuration, and all of the reset voltage at terminal 8 is across the collector-base junctions of transistors 11 and 12. Thus the breakdown design of the transistors is determined by its $BV_{cbo}$ characteristic, allowing the use of a standard high-voltage transistors. These advantages will become more apparent when considering the operation of the circuit in FIG. 1.

Figure 2:
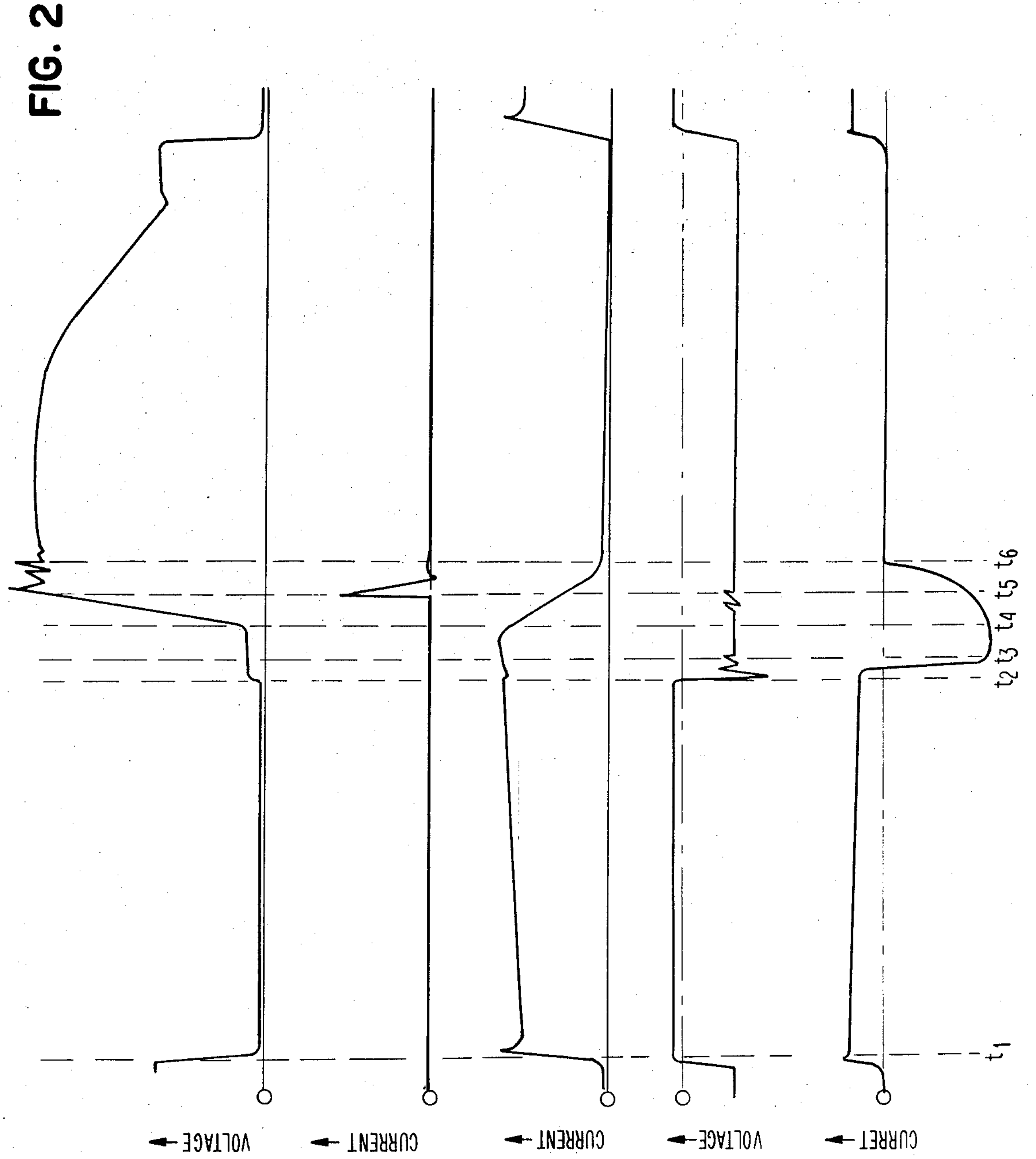
FIG. 2 is a graphical illustration of typical waveforms to illustrate the operation of the circuit of FIG. 1.

The operation of the preferred embodiment invention can best be described by referring to FIG. 2 in conjunction with FIG. 1.

It is convenient to begin by assuming that the waveform from control unit 22 at control element 10 is at its negative potential. In this condition, control transistor 17 and switching transistors 11 and 12 are cut off and there is substantially no current through winding 2 from supply 6. The potential at the collector terminals of switching transistors 11 and 12, termed $V_{c(switch)}$, is essentially $E_{in}$ (see FIG. 2a). $E_{in}$ at terminal 6 is relatively unregulated and may vary substantially, i.e., from 240 to 380 volts in a typical case. In this illustration, it is assumed that $E_{in}$ is + 300 volts at $T_1$.

When a square positive pulse appears at the base of transistors 15 and 16, these transistors become conductive and current flows to the base of control transistor 17. Transistor 17 becomes conductive as the base-emitter potential, $V_{b(control}$, of transistor 17 rises from its negative, cut off level, to a positive level at time $t_1$ (FIG. 2*d*). In a typical circuit $V_{b(control)}$ is around 1 volt. With transistor 17 turned on, the potential at the emitters of transistors 11 and 12 decreases, causing a conductive path to be established between the constant bias of around 20 volts applied at terminal 21, bias-limiting resistor 18, the base-emitter junctions of transistors 11 and 12, the collector-emitter path of transistor 17 and ground. Current, termed $I_{b(switch)}$, flows (FIG. 2*e*), causing transistors 11 and 12 to turn on at approximately time $t_1$.

The potential $V_{c(switch)}$ rapidly decreases from 300 volts to essentially zero volts (FIG. 2a). Current flows in primary winding 2 of transformer 1 (FIG. 2c). This current, termed $I_{primary}$, is initially around 5 amperes in a typical circuit. This current induces current flowing in the opposite direction in secondary winding 3 which flows through diode 23, the output filter and the load at terminals 4 and 5.

At this point, switching transistors 11 and 12 are conductive, preferably in saturation, with control element 10 turned on, and there is a virtual short circuit between the emitters and collectors of the switching transistors. Transistor 17 is not saturated, but operates in the active region, due to the limitation placed on it by the compound connection of transistors 15, 16 and 17. Nevertheless, transistor 17 is virtually a short circuit, having a minimal voltage drop across it. Resistor 18 accommodates the actual potential level at the bases of transistors 13 and 14 to the operation of the circuit.

If a compound connection were not used for control element 10, i.e., if transistors 15 and 16 were eliminated and the base of transistor 17 driven directly by control unit 22, transistor 17 could be operated in saturation.

In either of the two possible circuit designs discussed, the drop across control element 10 is kept at a minimum. At cut-off, this drop rises about to the value of supply 21 plus any internal transients in the semiconductors. Thus, almost the entire voltage at cut-off is borne by switching transistors 11 and 12.

Returning now to a consideration of FIGS. 1 and 2, at time $t_2$, the square pulse from control unit 22 decreases to about −6 volts. The base-emitter voltage of control transistor 17, $V_{b(control)}$, (FIG. 2*d*) declines quickly from around +1 volt to −5 volts, back-biasing the base-emitter junction through diode 60. Transistor 17 is thereby rendered non-conductive and is cut off. Its collector rises to about the level of bias supply 21. This is the largest potential change experienced by the control transistor, as it is never exposed to the large swing due to the primary winding 2 at cut off.

As transistor 17 turns off, this causes switching transistors 11 and 12 to turn off as well. The current flowing from bias 21 through the emitters of switching transistors 11 and 12, $I_{b(switch)}$, declines quickly and reverses, the base current reaching around −5 amps shortly thereafter at time $t_3$ (FIG. 2e).

When transistors 11 and 12 turn off, the potential at terminal 8 of primary winding 2, $V_{c(switch)}$, jumps from around 20 volts at time $t_4$ to a peak reset voltage of 600 volts between time $t_4$ and $t_5$ (FIG. 2a). This tremendous voltage spike is due to the energy stored in primary 2; it would theoretically approach infinity except for clamping action of regulation means 40. This potential is entirely across the bias, base and collector of the switching transistors because at this point the emitters of the switching transistors are open. This effect yields two practical and important results. First, as explained previously, control element 10 is completely isolated from the voltage swing $V_{c(switch)}$. Second, the switching transistors are in no danger of breaking down because the applicable breakdown voltage, $BV_{cbo}$ is not exceeded. For example, in a high-voltage transistor, $BV_{cbo}$ may be greater than 800 volts.

It is appropriate to compare this result with a typical prior art switch. In the prior art, the square wave pulses be applied directly to the base of switching transistors 11 and 12. Control element 10 is eliminated. With this kind of circuit the collector-to-emitter breakdown voltage, $BV_{ceo}$, is the design criterion because the potential is across the collector-emitter junction at turn-off. $BV_{ceo}$ is typically one-half the value of $BV_{cbo}$. But even this design is not conservative enough because the transistor will "lock-up" at less than $BV_{cbo}$. This lock-up voltage, termed $BV_{ce(sus)}$, is less than $BV_{ceo}$ and may be around 325 volts for a high voltage transistor.

It is clear, then, that the inventive circuit allows the use of an inexpensive, readily available high-voltage transistor as the switching elements. Special designs are avoided.

Returning now to the operation of the circuit, as the reset potential at terminal 8 on primary winding 2 in FIG. 1 overshoots the supply voltage, $E_{in}$, regulation means 40 operates to clamp the reset potential at around 600 volts at time $t_5$ (FIG. 2*a*). In the example given, a potential of about 300 volts is stored by capacitor 36 from the previous cycle of operation, maintaining diode 33 back biased. However, when the reset potential at 8 begins to exceed 600 volts, diode 33 is rendered conductive and current flows into capacitor 36. A portion of the difference between the reset potential and the supply voltage is sensed across terminals 7 and 9 of primary winding 2. Capacitor 34 and diodes 38 and 39 operate to store a charge on capacitor 35 proportional to the peak to peak excursion of terminal 9. This excursion is, in turn, proportional to $E_{in}$ plus the aforesaid reset difference potential. Potentiometer 37 is adjusted to provide bias, communicated through zener diode 32, to the base of transistor 30, so that transistors 30 and 31 are rendered conductive as a function of $E_{in}$ plus the potential between terminals 7 and 8 at reset. Thus, conduction through transistors 30 and 31 adjusts the potential across 36 and the back bias at diode 33 to the desired threshold as operating conditions vary. FIG. **2*b* illustrates the current flowing through diode 33 of the regulation means between times $t_5$ and $t_6$, denoted $I_{clamp}$. As $I_{clamp}$ is dissipated through the primary winding, $I_{primary}$ (FIG. 2*c***) becomes nearly zero at $t_6$ and $V_{c(switch)}$ gradually returns to the supply potential, $E_{in}$. This completes one full cycle of the circuit operation.

Figure 3:
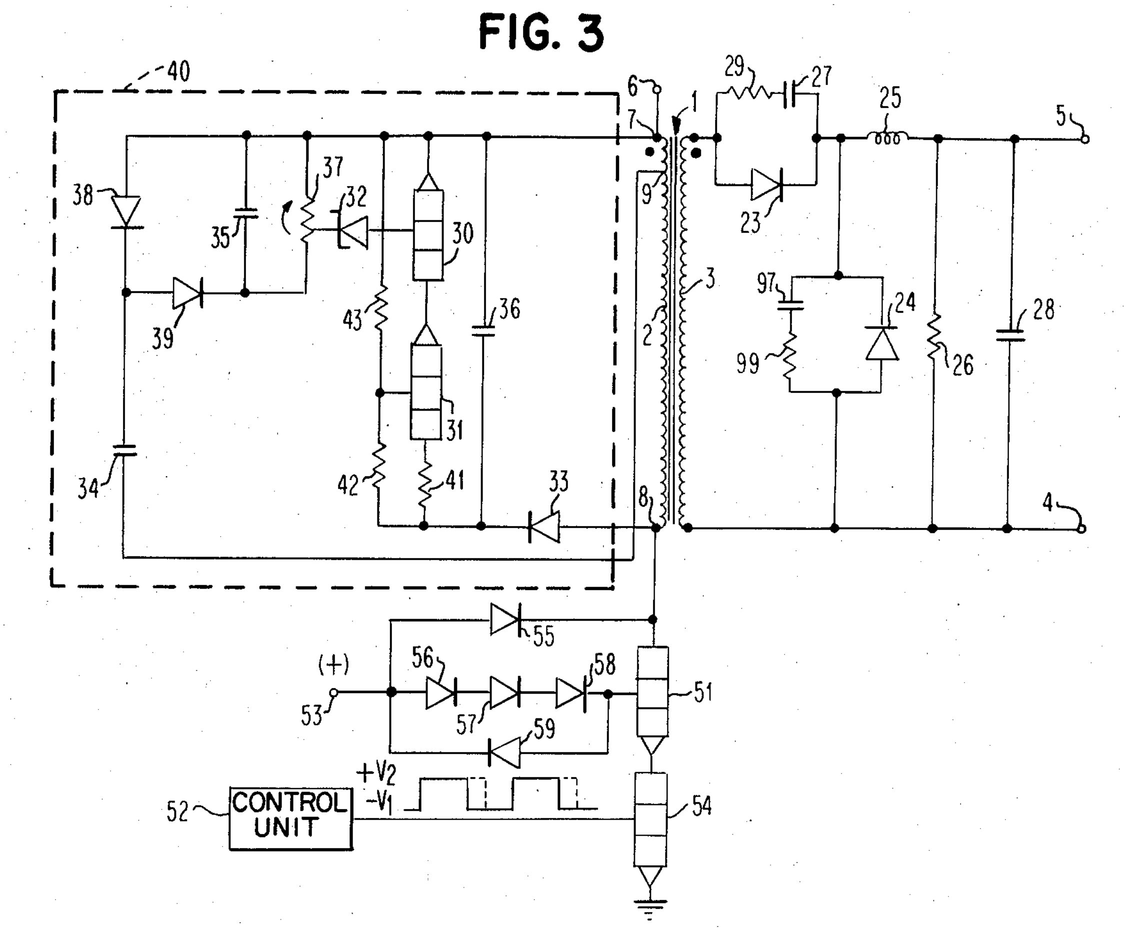
FIGS. 3 and 4 are schematic diagrams showing modifications of the switching and control elements of FIG. 1 in accordance with the invention.

FIG. 3 illustrates an alternate embodiment of the invention in which diodes are used in the base of switching transistor 51 to limit saturation. Transistor 54 is the control transistor. The remainder of the circuit and its operation is the same as that of FIG. 1.

Diodes 56, 57 and 58 cause a voltage drop from bias 53 to the base of transistor 51, ensuring that the base voltage is lower than the voltage at the cathode of diode 55. Hence, the collector never becomes forward-biased. Diode 55 acts to channel around the base any excess base current over that required to bring transistor 51 to the edge of saturation. Diode 59 keeps the bias at the base of the switching transistor from exceeding the bias supply 53 at turn off. Control transistor 54 is driven between its active region and cut-off to limit the base-emitter current of transistor 51.

Figure 4:
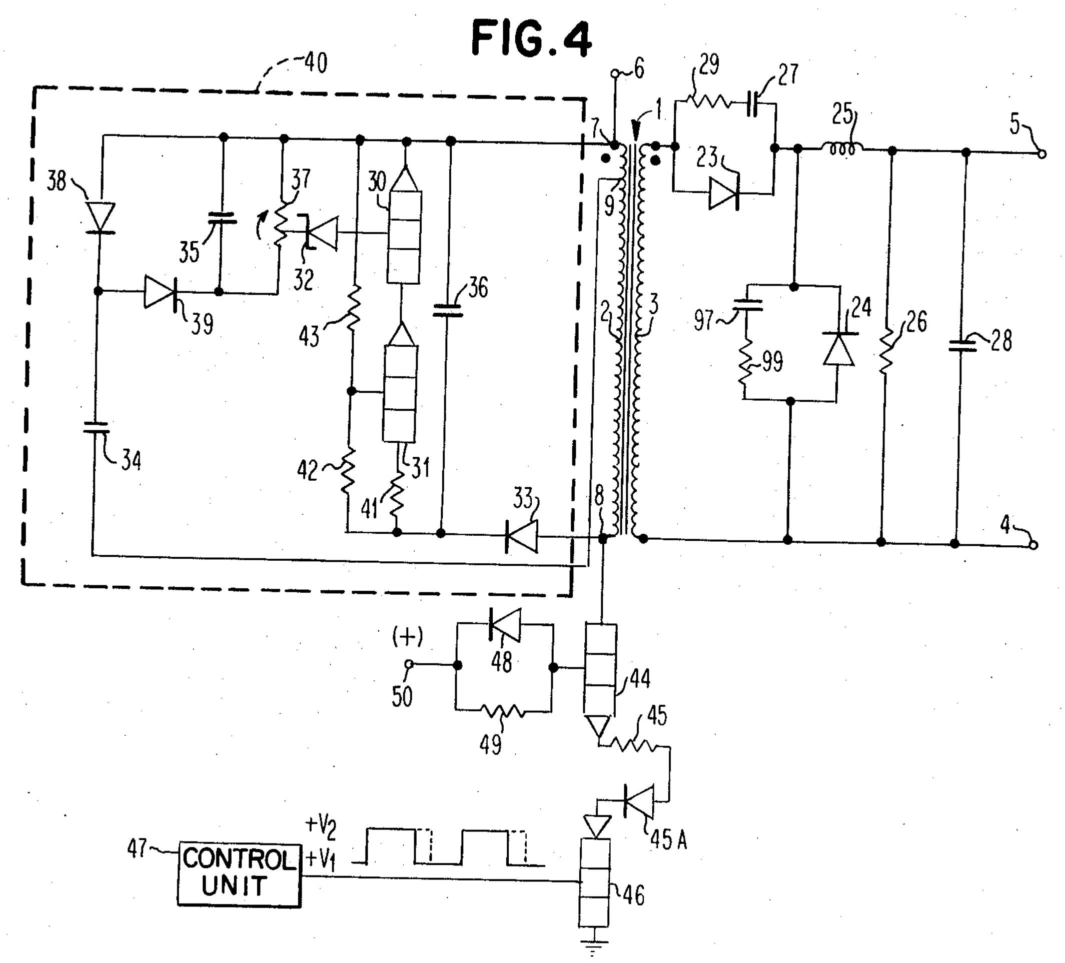

FIG. 4 illustrates an embodiment of the invention using control and switching transistors of opposite conductivity type.

Control transistor 46 is a PNP device which is rendered conductive when a square pulse from control unit 47 is at $V_1$. Transistor 46 is cut-off when the square pulse has a higher value, $V_2$.

Switching transistor 44 corresponds to transistor 11 (or 12) in FIG. 1. For ease of illustration in FIG. 4, only one switching transistor 44 is shown, although a parallel connection as in FIG. 1 could be used. Bias limiting resistor 49, bias diode 48 and bias supply 50 correspond to elements 19, 18 and 21, respectively, in FIG. 1. The remainder of the circuit in FIG. 4 may be the same as that in FIG. 1 and is shown as such. In a typical circuit, bias 50 has a value of 10 volts, $V_1$ is 5 volts and $V_2$ is 30 volts.

In the present embodiment, control transistor 46 goes into saturation when $V_1$ is applied from control unit 47. To limit current in the emitter of switching transistor 44 at turn-on, resistor 45 is placed in the emitter circuit. Diode 45A is provided to protect the emitter-base junctions of transistors 44 and 46 against reverse breakdown. In practice, resistor 45 may be dispensed with if $V_1$ is selected so as to drive transistor 46 into its active region, but not into saturation.

As with the circuit described in FIG. 1, the important consideration is that both the control transistor 46 and the switching transistor 44 are in their cut-off condition when they are turned off. Under these circumstances, switching transistor 44 is operating in an emitter-open condition, allowing transistor 44 to be designed for its $BV_{cbo}$ characteristic. When switching transistor 44 cuts off, diode 48 clamps its base to bias 50, and control transistor 46 remains isolated from the large swings occurring at terminal 8.

Figure 5:
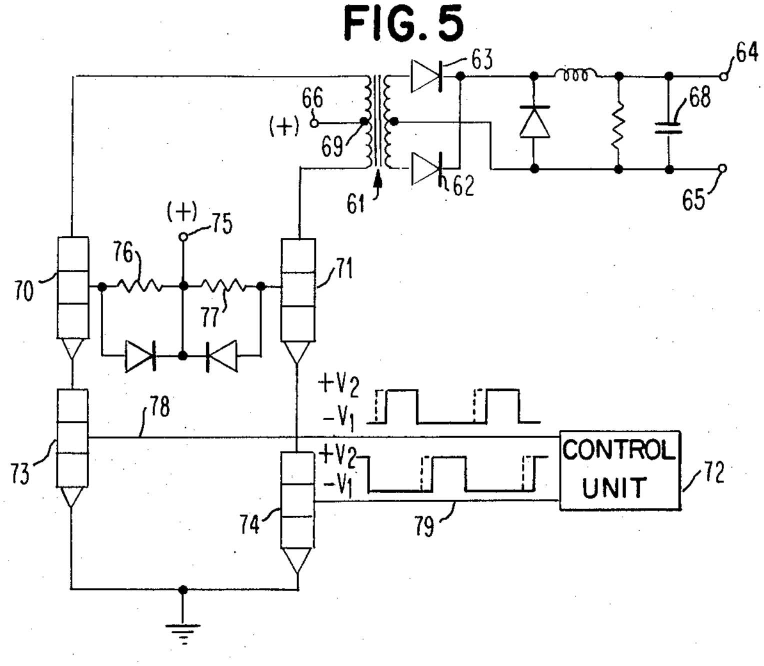
FIG. 5 is a schematic diagram of a push-pull type of DC converter designed in accordance with the present invention.

FIG. 5 is another embodiment of the invention, illustrating a DC converter wherein two sets of control and switching transistors are used in push-pull operation. Although not as economical as the design of FIG. 1, the push-pull configuration provides higher efficiency and improved regulation.

The source of unregulated DC potential 66 is connected at midpoint 69 of the primary winding of transformer 61. Transistors 70 and 71 are high voltage switching transistors connected at their bases to a bias supply 75 through bias limiting resistors 76 and 77, respectively. The collector electrodes of transistors 70 and 71 are connected to opposite terminals of the primary of transformer 61. The emitters of switching transistors 70 and 71 are connected in series relationship to the collectors of control transistors 73 and 74, respectively. Control transistors 73 and 74 are low-voltage transistors which are switched by control signals applied to their bases on lines 78 and 79, respectively. Control unit 72 supplies square output pulses which are 180° out of phase with each other on output signal lines 78 and 79, thereby switching the control transistors off and on, out of phase.

The rectifier stage connected across the secondary of transformer 61 comprises diodes 62 and 63 and filter capacitor 68 connected in conventional fashion across load terminals 64 and 65.

In operation, a pulse from control unit 72 turns one of control transistors, say transistor 73, on. Transistor 74 is non-conductive, the signal at its base being out of phase with the signal at the base of transistor 73. As transistor 73 conducts, it drives the emitter of switching transistor 70, causing the base-emitter junction to conduct. Transistor 70 then turns on and current flows from unregulated source 66, through the upper half of the primary winding of transformer 61, to ground through transistors 70 and 73. Current induced in the secondary of transformer 61 is rectified and filtered to produce a DC voltage across load terminals 64 and 65.

When the signal on line 78 from control unit 72 returns to $-V_1$, transistor 73 turns off, thereby cutting off transistor 70. The same principle explained in the embodiment of FIG. 1 is involved at this point in FIG. 5: at cut-off, switching transistor is in the open-emitter condition due to the constant bias 75 at its base. Hence, the breakdown voltage which transistor 70 may be designed to withstand is $BV_{cbo}$. In addition, control transistor 73 is completely isolated from the high voltage swing at the collector of transistor 70.

The operation of transistors 71 and 74 when turned on by a pulse on line 79 from control unit 72 is the same as described for transistors 70 and 73.

It will be recognized by those of skill in the art that a device may be desirable at the collector terminals of switching transistors 70 and 71 to clamp the collector voltage. Though most of the transformer core magnetization energy is absorbed through the action of the full wave load current, clamp is necessary if the switching transistors alone are unable to absorb the leakage inductance induced current at turn-off. A simple clamp which is known to the prior art comprises a diode at the collector of each transistor reverse-biased by a clamp supply voltage having a value equal to the maximum voltage which the switching transistors are designed to withstand. In a typical circuit of FIG. 5, the anode of a diode is connected to the collector of transistor 70. Its cathode is connected to a clamp supply of, say, 760 volts, which is well below $BV_{cbo}$ at 800 volts. When the transistor 70 is in the on state and represents a virtual short circuit, the diode is reverse-biased and has no effect on circuit performance. When transistor 70 is cut off, if the voltage at its collector attempts to exceed 760 volts, the diode becomes conductive and clamps the voltage, $V_{c(switch)}$, to around 760 volts. A similar circuit would be connected at the collector of switching transistor 71 of FIG. 5.

Figure 6:
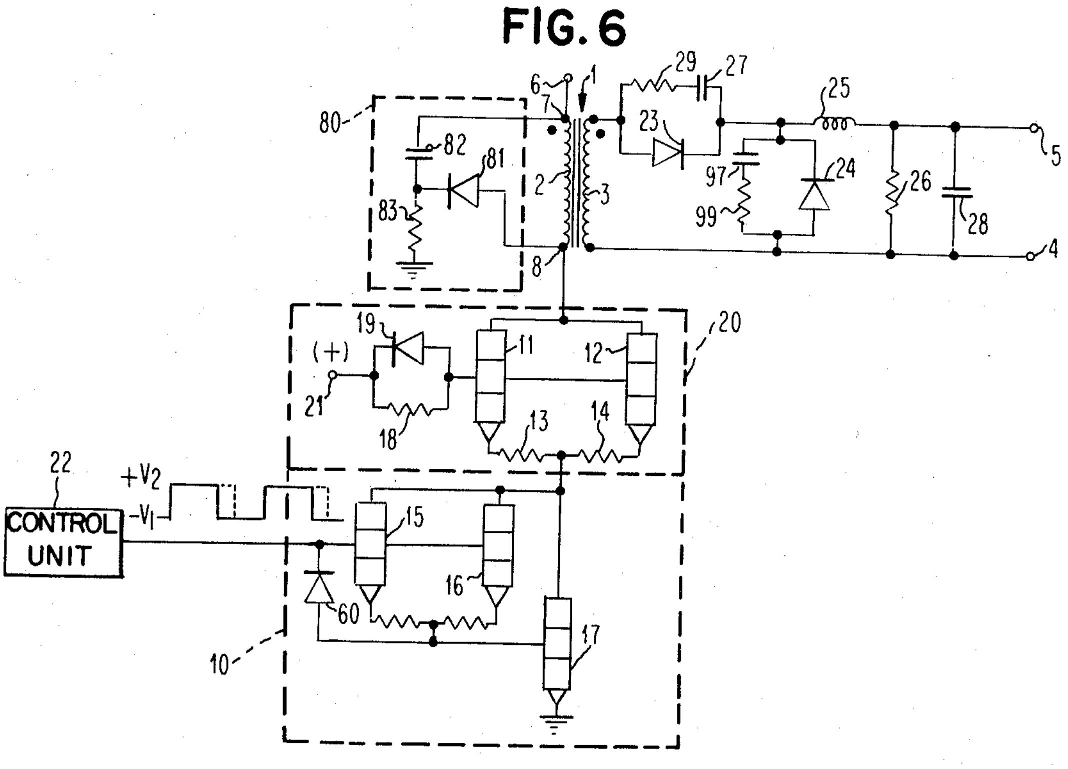
FIG. 6 is an embodiment of the invention showing a regulation means which is alternative to the preferred regulation means of FIG. 1.

FIG. 6 illustrates a cost-reduced embodiment of a regulation means for dissipating the voltage surge of the circuit in FIG. 1 at terminal 8 of the primary winding when the switching transistors 11 and 12 are cut off. As shown, regulation means 80 in FIG. 5 replaces regulation means 40 in FIG. 1 at terminals 7 and 8 of primary winding 2. The remainder of the circuit in FIG. 6 is identical to that in FIG. 1.

In operation, as the potential at terminal 8 exceeds the potential at the cathode of diode 81 when transistors 11 and 12 turn off, current flows through diode 81; the charge due to the voltage surge is then stored on capacitor 82. The energy stored on capacitor 82 then decays through resistor 83 to ground. The values of capacitor 82 and resistor 83 are selected so that sufficient energy decay is completed prior to the next turn-off of the switching transistor to accommodate the next reset surge.

The following table sets forth the identification of certain components utilized to practice the embodiment of the invention illustrated in FIG. 1. This information is not meant to be limiting but is to assist those of skill in the art to practice the invention.

| Component | Identification or Value |
|---|---|
| 11, 12 | Motorola MJ 9000 |
| 17 | 2N 3447 |
| 15, 16 | 2N 3725 |
| 18 | 9 ohms, 30 watts |
| 19 | 1 Amp, 30 volts |
| 30, 31 | RCA 2N 4240 |
| 32 | 10 volts, 1/4 watts |
| 33 | 1 Amp, 600 volts |
| 38, 39 | 1/2 Amp, 150 volts |
| 35 | 0.1 μf, 50 volts |
| 36 | 0.22 μf, 600 volts |

While the invention has been particularly shown and described with reference to a preferred embodiment thereof, it will be understood by those skilled in the art that various changes in form and detail may be made therein without departing from the spirit and scope of the invention. For example, other components than those illustrated may be used.

What is claimed is:

1. A transistor switching regulator comprising:
a source of a direct current input voltage, an inductive load circuit element, and switching means connected in series;
said switching means including:
a switching transistor and a control transistor connected in series relationship;
cyclically operating control means coupled to the base of said control transistor for operating the control transistor between its cut-off and conductive region;
bias means coupled to the base of said switching transistor for operating the switching transistor in its conductive region when said control transistor is conductive, thereby causing nearly the entire input voltage to be across the inductive load circuit element with little power being dissipated in the transistors;
said bias means for operating the switching transistor at cut-off in its open-emitter condition when said control transistor is cut off, thereby effectively isolating the control transistor from voltage swings appearing at the inductive load circuit element and allowing the switching transistor to be selected according to its collector-base voltage breakdown characteristic.

2. A regulator as in claim 1 wherein said switching transistor is operated between cut-off and saturation.

3. A regulator as in claim 1 wherein said control transistor is operated between cut-off and at least near saturation.

4. A regulator as in claim 1 further comprising regulation means for clamping the voltage developed by the inductive load circuit element at the switching transistor when said switching transistor is cut off.

5. A regulator as in claim 1 wherein said control and switching transistors are of the same conductivity type, the emitter of the switching transistor being connected to the collector of the control transistor.

6. A regulator as in claim 1 wherein said control and switching transistors are of opposite conductivity type, the emitter of the switching transistor being connected to the emitter of the control transistor.

7. A regulator as in claim 1 wherein said inductive load circuit element is a transformer primary and further comprising:
a transformer secondary; and
wave-wave rectifier means connected across the transformer secondary for rectifying voltage induced in the secondary by the primary and for supplying a load with rectified voltage.

8. A regulator as in claim 7 further comprising:
a clamp circuit connected to the collector of said switching transistor adapted to accept energy from said transformer during resetting of the core thereof and to limit the potential at the collector of the switching transistor during said resetting.

9. A regulator as in claim 7 wherein said bias means includes:
means for driving said switching transistor into saturation when said control transistor is conductive,
and means providing low impedance, effectively grounded base operation of said switching transistor as the latter is cut off.

10. In a push-pull switching converter operating from an unregulated direct current supply voltage, including a pair of switching means connected to the supply voltage and coupled to an output load by a transformer; and cyclically operating control means for alternately switching the switching means on and off out of phase with each other, thereby applying the supply voltage intermittently to the load, the improvement wherein each one of said pair of switching means comprises:

a switching transistor and a control transistor connected in series relationship;

said cyclically operating control means coupled to the base of said control transistor for operating the control transistor between its cut-off and conductive region;

bias means coupled to the base of said switching transistor for operating the switching transistor in its conductive region when said control transistor is conductive, thereby causing nearly the entire supply voltage to be across the transformer primary with little power being dissipated in the transistor;

said bias means for operating the switching transistor at cut-off in its open-emitter condition when said control transistor is cut-off, thereby effectively isolating the control transistor from voltage swings appearing at the transformer primary and allowing the switching transistor to be selected according to its collector-base voltage breakdown characteristic.

* * * * *

UNITED STATES PATENT OFFICE
CERTIFICATE OF CORRECTION

Patent No. 3,697,852 (139,076) Dated October 10, 1972

Inventor(s) Clarence G. Gerbitz

It is certified that error appears in the above-identified patent and that said Letters Patent are hereby corrected as shown below:

IN THE ABSTRACT: Line 5 the word "aRe" should read --are--. Line 7 the word "switching" should read --it--. Line 10 the word "switce-" should read --switch- --.

Column 10, line 42 the word "wave-wave" should read --half-wave--.

Signed and sealed this 29th day of May 1973.

(SEAL)
Attest:

EDWARD M.FLETCHER,JR.
Attesting Officer

ROBERT GOTTSCHALK
Commissioner of Patents